United States Patent
Hebert et al.

(10) Patent No.: US 12,335,312 B2
(45) Date of Patent: Jun. 17, 2025

(54) DYNAMIC PROTECTION OF WEB FORMS

(71) Applicant: SAP SE, Walldorf (DE)

(72) Inventors: Cedric Hebert, Mouans Sartoux (FR); Merve Sahin, Antibes (FR)

(73) Assignee: SAP SE, Walldorf (DE)

( * ) Notice: Subject to any disclaimer, the term of this patent is extended or adjusted under 35 U.S.C. 154(b) by 370 days.

(21) Appl. No.: 17/882,436

(22) Filed: Aug. 5, 2022

(65) Prior Publication Data
US 2024/0048593 A1    Feb. 8, 2024

(51) Int. Cl.
*H04L 9/40* (2022.01)
*G06F 16/958* (2019.01)
*G06F 40/103* (2020.01)
*G06F 40/143* (2020.01)

(52) U.S. Cl.
CPC ........... *H04L 63/20* (2013.01); *G06F 16/986* (2019.01); *G06F 40/103* (2020.01); *G06F 40/143* (2020.01); *H04L 63/1433* (2013.01)

(58) Field of Classification Search
None
See application file for complete search history.

(56) References Cited

U.S. PATENT DOCUMENTS

| | | | |
|---|---|---|---|
| 8,752,183 B1 * | 6/2014 | Heiderich | G06F 21/577 726/25 |
| 10,476,895 B2 | 11/2019 | Hebert | |
| 10,616,263 B1 * | 4/2020 | Wells | H04L 63/1433 |
| 2008/0120420 A1 * | 5/2008 | Sima | G06F 21/577 707/E17.108 |
| 2009/0019313 A1 * | 1/2009 | Pokala | G06F 9/451 714/37 |
| 2011/0239300 A1 * | 9/2011 | Klein | G06F 21/565 726/23 |
| 2013/0091578 A1 * | 4/2013 | Bisht | G06F 21/53 726/25 |
| 2013/0139247 A1 * | 5/2013 | Cianfrocca | H04L 63/02 726/14 |
| 2015/0106686 A1 * | 4/2015 | Blitzstein | G06F 40/14 715/234 |
| 2015/0341387 A1 * | 11/2015 | Ho | H04L 63/20 726/1 |
| 2019/0222587 A1 * | 7/2019 | Kamir | H04L 63/1491 |
| 2020/0213359 A1 * | 7/2020 | Arbel | H04L 63/20 |
| 2021/0173928 A1 * | 6/2021 | Grafi | G06F 21/44 |
| 2022/0198024 A1 * | 6/2022 | Hendrickx | G06F 8/70 |

OTHER PUBLICATIONS

Web-Application and API Security (WAAS), paloaltonetworks.com, visited Jun. 30, 2022, 6 pages.
"What is a WAF? | Web Application Firewall explained," cloudflare.com, visited Jul. 12, 2022, 5 pages.

* cited by examiner

*Primary Examiner* — Christopher C Harris
(74) *Attorney, Agent, or Firm* — Klarquist Sparkman, LLP

(57) ABSTRACT

The source code of an HTML form can be analyzed to derive parameter rules that are subsequently enforced when apparent content of the HTML form is received. Such parameter rules can be drawn from client-side restrictions that are extracted from the HTML source, which are then enforced to prevent content violating the rules from reaching the backend. A proxy can sit between the application and the apparent browser. Dynamically generated HTML can be supported via a headless browser that mirrors HTML that would be present at a browser. Useful for preventing HTML form-based attacks and identifying clear cases of malicious HTML form requests.

19 Claims, 10 Drawing Sheets

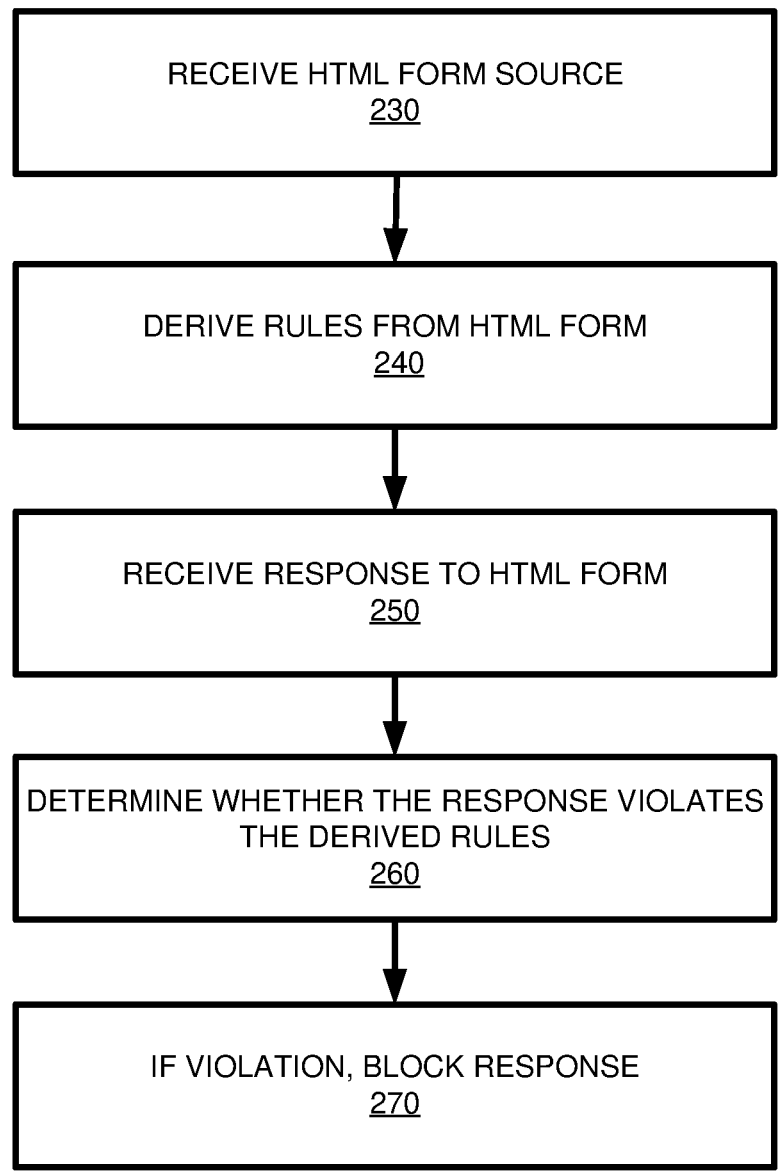
FIG. 2

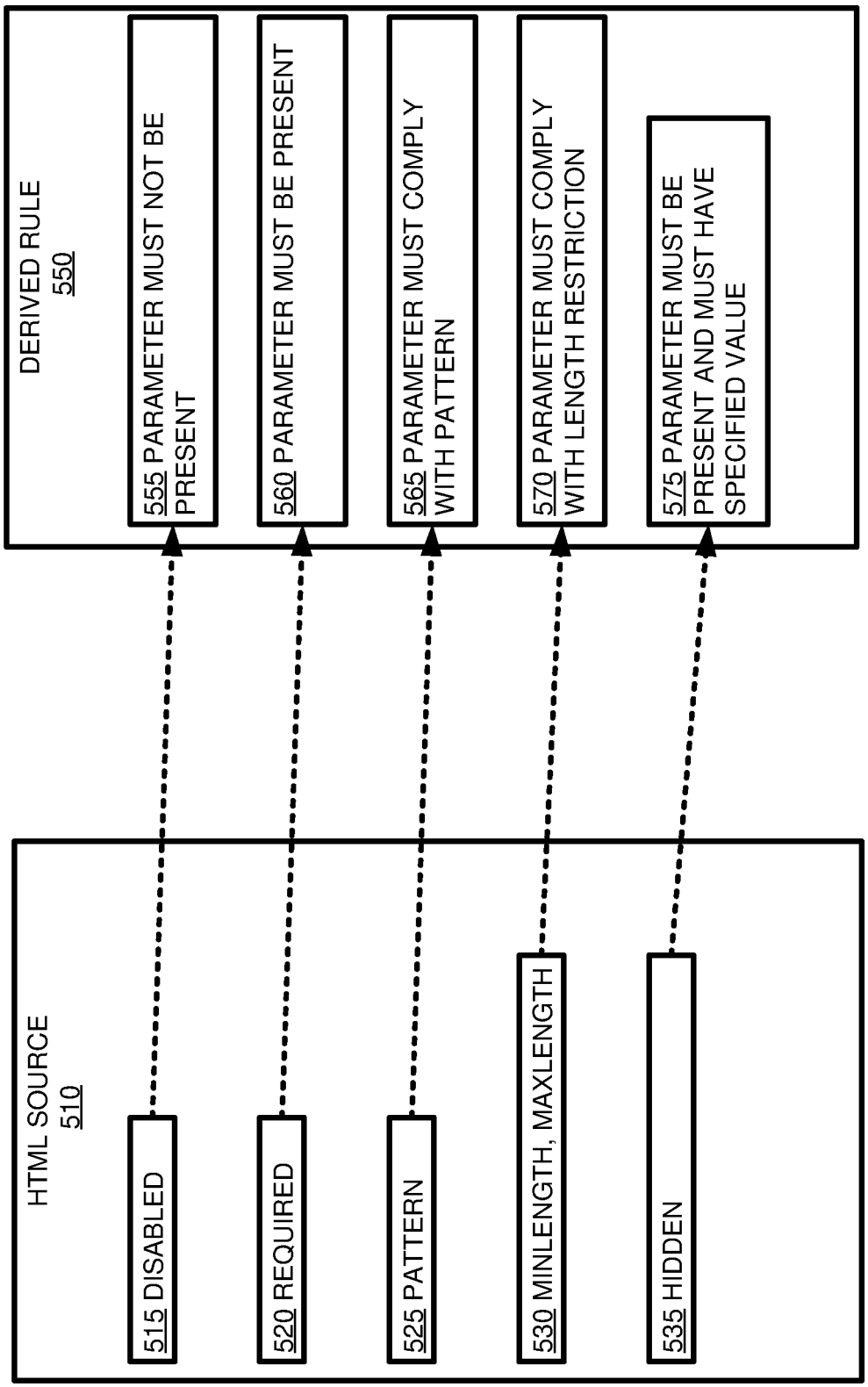

HTML SOURCE 610

```
<FORM ACTION="/ACTION_PAGE.PHP">
<LABEL FOR="PRODUCT">SELECTED PRODUCT:</LABEL><BR>
<INPUT TYPE="TEXT" ID="PRODUCT" NAME="PRODUCT" VALUE=12 DISABLED><BR>
<LABEL FOR="AMOUNT">QUANTITY:</LABEL><BR>
<INPUT TYPE="TEXT" ID="AMOUNT" NAME="AMOUNT" VALUE="1" TYPE="NUMBER" MIN="1"
MAX="10" REQUIRED><BR>
<LABEL FOR="EMAIL">SEND BILL TO:</LABEL><BR>
<INPUT TYPE="TEXT" ID="EMAIL" NAME="EMAIL"
PATTERN="^[A-ZA-Z0-9._%+-]+@[AZA-Z0-9.-]+\.[A-ZA-Z]{2,4}$"
REQUIRED><BR>
<LABEL FOR="ADDRESS">SHIP TO:</LABEL><BR>
<INPUT TYPE="TEXT" ID="ADDRESS" NAME="ADDRESS" MINLENGTH="3" MAXLENGTH="20"
REQUIRED><BR><BR>
<INPUT TYPE="HIDDEN" NAME="REF" VALUE="CUST-322">
<INPUT TYPE="SUBMIT" VALUE="SUBMIT">
</FORM>
```

DERIVED RULES 655

| Verb | Url | Key | Value | Alert if Present | Alert if Absent | Alert if Modified | Length min | Length max | Min | Max | Regex |
|---|---|---|---|---|---|---|---|---|---|---|---|
| POST | /action_page.php | product | | X | | | | | | | |
| POST | /action_page.php | amount | | | X | | | | 1 | 10 | |
| POST | /action_page.php | email | | | X | | | | | | ^[a-za-z0-9._%+-]+@[A-Za-z0-9.-]+\.[a-zA-Z]{2,4}$ |
| POST | /action_page.php | address | | | X | | 3 | 20 | | | |
| POST | /action_page.php | Ref | cust-322 | | X | X | | | | | |

DYNAMIC PROTECTION OF WEB FORMS

FIELD

The field generally relates to computer network security, and more particularly to malicious attacks via web forms.

BACKGROUND

Web forms provide a common way to discover vulnerabilities in web applications. Using web forms as a starting point, an attacker can discover security holes and eventually execute arbitrary code, login as an administrator, or otherwise breach the security of a network. Software developers attempt to defend against such activity by putting safeguards into place.

However, in practice, such safeguards are inconsistently implemented, leaving opportunities for an attacker to exploit web applications. Unfortunately, a clever attacker need only find one exploitable vulnerability to mount a successful attack. Therefore, there remains significant room for improvement in protection of web forms.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method comprises a computer-implemented method comprising receiving source code of an HTML form from a backend application; deriving one or more derived rules from the source code of the HTML form; receiving an apparent response to the HTML form, wherein the apparent response comprises apparent parameter content of the HTML form; determining whether the apparent parameter content of the HTML form of the apparent response violates the one or more derived rules; responsive to determining that the apparent parameter content of the HTML form of the apparent response violates the one or more derived rules, blocking the apparent parameter content of the HTML form from the backend application.

In another embodiment, a computing system comprises a computing system comprising at least one hardware processor; at least one memory coupled to the at least one hardware processor; and one or more non-transitory computer-readable media having stored therein computer-executable instructions that, when executed by the computing system, cause the computing system to perform receiving code of an HTML form from a backend application; deriving one or more derived rules from the code of the HTML form; receiving an HTTP request with apparent content of the HTML form; determining whether the apparent content of the HTML form of the HTTP request violates the one or more rules; responsive to determining that apparent content of the HTML form violates the one or more rules, blocking the apparent content of the HTML form from the backend application.

In another embodiment, one or more non-transitory computer-readable media comprising computer-executable instructions that, when executed by a computing system, cause the computing system to perform operations comprising receiving code of an HTML form from a backend application; deriving one or more rules from the code of the HTML form, wherein the deriving comprises extracting a value restriction on a parameter of the HTML form from the code of the HTML form; receiving an HTTP request with apparent content of the HTML form in response to the HTML form, wherein the apparent content comprises a value for an apparently filled-in parameter of the HTML form; determining whether the apparent content of the HTML form of the HTTP request violates the one or more rules, wherein the determining comprises comparing the value to the value restriction; responsive to determining that apparent content of the HTML form violates the one or more rules, blocking the apparent content of the HTML form from the backend application.

As described herein, a variety of other features and advantages can be incorporated into the technologies as desired.

BRIEF DESCRIPTION OF THE DRAWINGS

FIG. 2 is a flowchart of an example method of implementing protection of web forms.

FIG. 5 is a block diagram of an example mapping of HTML parameter conditions to derived rules.

FIG. 6 is a block diagram of example HTML source and derived rules.

FIG. 7 is a block diagram of an example table showing derived rule definitions.

DETAILED DESCRIPTION

Example 1—Overview

Web applications continue to be exploited on a regular basis. A very common way to discover vulnerabilities is to probe HTML Form elements. Developers defend against probing by putting safeguards into place, such as setting maximum field size and regular expressions to validate the content.

Ideally, such safeguards must be implemented twice: in the server to block malicious requests, and in the client, to prevent users from entering faulty data by mistake. However, in practice, gaps can be left in such safeguards.

Accordingly, the technologies described herein can dynamically derive detection rules automatically, based on the declared client-side security, parameter attributes, and the like.

Such an approach can provide numerous benefits. For example, the derived rules can potentially detect and block requests that the server would have let through (e.g., due to missing or misconfigured backend protection rules). Also, the rules alert with extremely high confidence that the requests with detected violations were malicious and were not sent in error.

Other techniques such as supporting dynamically modified HTML forms can be used as described herein.

The described technologies thus offer considerable improvements over conventional security techniques.

Example 2—Example System Implementing Protection of Web Forms

Figure 1:
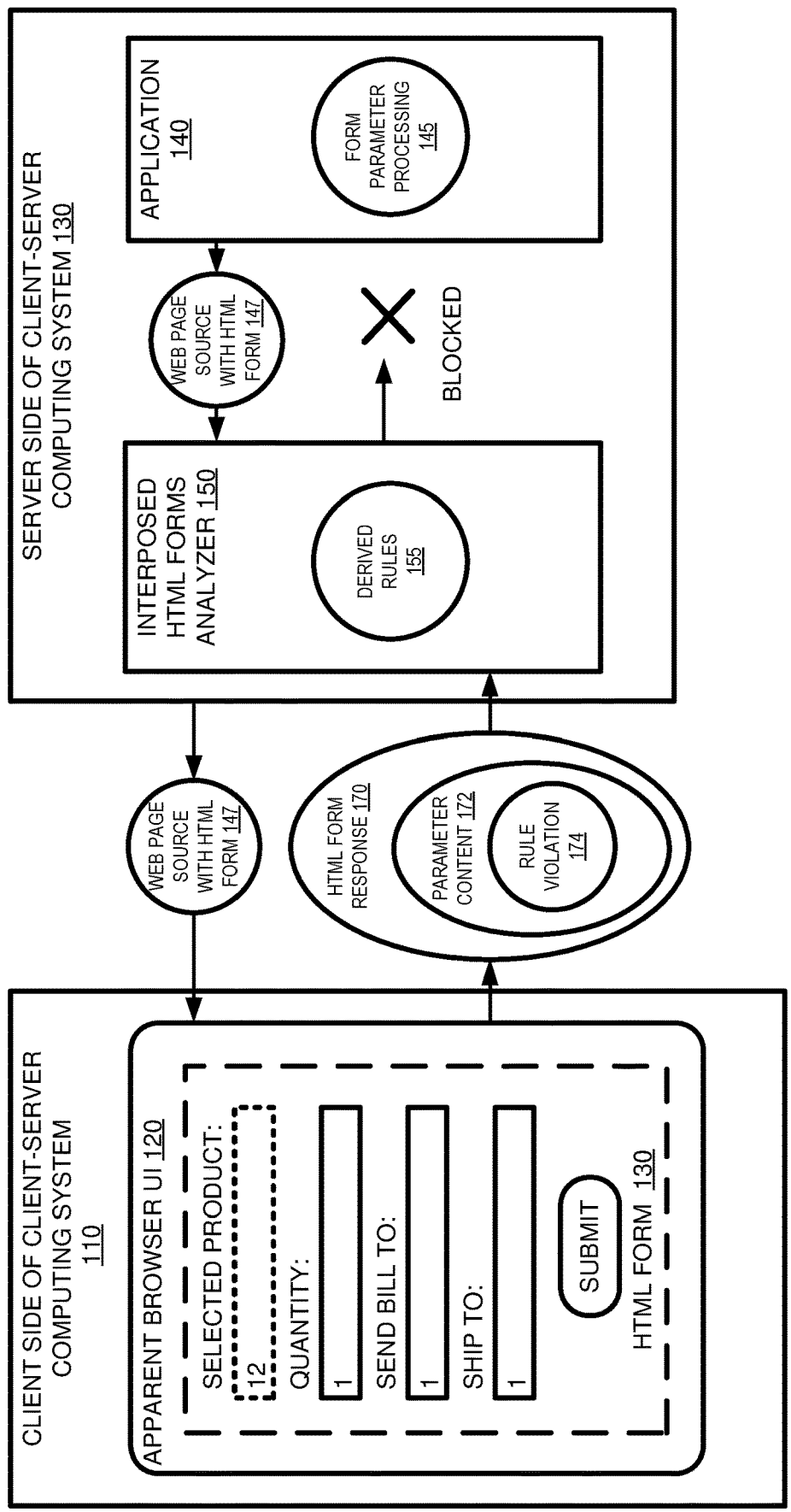
FIG. 1 is a block diagram of an example system implementing protection of web forms.

FIG. 1 is a block diagram of an example system 100 implementing protection of web forms. In the example, the system 100 includes a client side 110 of a client-server computing system and a server side 130 of a client-server computing system. The client side 110 apparently includes an apparent browser that presents a browser user interface 120 presenting an HTML form into which a client computer can enter parameter values for various parameters.

In practice, the backend application 140 outputs the source code of the HTML form 130 as part of the source code of a web page 147, which is monitored by the interposed HTML forms analyzer 150. The web page source code 147 is sent to the client side 110 where it is ordinarily presented as a displayed HTML form 130 by a browser with a browser user interface 120.

A response 170 is eventually received, and the form parameter processing functionality 145 is programmed to accept the parameter content 172 and perform further processing, which can be according to whatever logic is appropriate for the application 140 (e.g., ordering a quantity of goods, storing a customer name, storing an address, grading an answer, or the like). In other words, the backend (e.g., server-side) application 140 is configured to send a form for presentation to the client 110, receive a response 170, and process the response, including any parameters provided via the form. Due to possible logic flaws or unanticipated scenarios, the form parameter processing functionality 145 may be vulnerable to attack. For example, unanticipated parameter values, empty or missing parameter values, very long string parameter values, or the like can cause execution in ways that can be exploited to probe or attack the host computing system 130 or related systems.

The interposed HTML forms analyzer 150 is configured to receive the web page 147 and generate derived rules 155 from the code of the HTML form in the web page 147. The interposed HTML forms browser can operate transparently to the application 140 and the apparent browser at the client 110.

Subsequently, a response 170 to the HTML form is received by the interposed HTML forms analyzer 150 from the apparent browser of the client side 110. Such a response 170 typically takes the form of an HTTP request from the apparent browser. The response 170 can comprise apparent parameter content 172 of the HTML form, some of which may contain a rule violation 174. As described herein such a rule violation 174 implies that client-side rules were bypassed, a false browser was used, or the like.

The interposed HTML forms analyzer 150 is configured to determine whether the parameter content of the response 172 violates one or more of the derived rules 155. If so, the interposed HTML forms analyzer 150 can block the response 170 (and therefore the apparent parameter content) from the backend application 140.

As shown, the HTML forms analyzer 150 can be configured as a (reverse) proxy that accepts responses 170 from the apparent browser and selectively forwards them to the backend application 140, depending on whether a rule violation is detected in the response.

Although HTML forms attacks can originate from a legitimate browser, attacks can also originate from hacked or false browsers as described herein. Therefore, although a browser UI 120 and displayed HTML form 130 are shown, in practice, such items may not actually be present. Thus, the browser is sometimes called an "apparent" browser. Similarly, the HTML form response 170 is sometimes called an "apparent HTML form response," and the parameter content 172 is sometimes called "apparent parameter content." In reality, no form may have actually been presented or displayed.

Any of the systems herein, including the system 100, can comprise at least one hardware processor and at least one memory coupled to the at least one hardware.

The system 100 can also comprise one or more non-transitory computer-readable media having stored therein computer-executable instructions that, when executed by the computing system, cause the computing system to perform any of the methods described herein.

In practice, the systems shown herein, such as system 100, can vary in complexity, with additional functionality, more complex components, and the like. For example, the server side 130 typically also includes web server functionality that is not shown. The backend application 140 may be implemented in part by supporting software for web applications. Additional components can be included to implement security, redundancy, load balancing, report design, and the like. Such components can be implemented in different computers that may or may not be geographically remote from the computers providing other functionality described herein.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the derived rules 155, the code for HTML forms, and the like can be stored in one or more computer-readable storage media or computer-readable storage devices. The technologies described herein can be generic to the specifics of operating systems or hardware and can be applied in any variety of environments to take advantage of the described features.

Example 3—Example Method Implementing Protection of Web Forms

FIG. 2 is a flowchart of an example method 200 of implementing protection of web forms and can be performed, for example, by the system of FIG. 1. The automated nature of the method 200 can be used in a variety of web application scenarios.

In the example, at 230, source code of an HTML form is received (e.g., from a backend application). As shown in FIG. 1, the code can be received from an interposed HTML forms analyzer that intercepts the code and forwards it, such an analyzer can simply monitor such code, or the like At 240, one or more rules are derived from the code of the HTML form. As described herein, the code of an HTML form may contain rules or conditions that are intended to be implemented on the client side. Accordingly, derived rules can be derived from the code of the HTML by extracting restrictions or other rules as described herein. For example, derived rule operands can be extracted from the HTML code depending on the rules or conditions present.

At 250, an apparent response to the HTML form is received (e.g., at the server side). For example, the response is apparently sent from a browser at which the form has been submitted back to the backend (e.g., server-side) application. As described wherein, the response can comprise an HTTP request that comprises the apparent HTML form response to the HTML form and is directed to the backend application.

Such a response can comprise apparent parameter content of the HTML form (e.g., an apparently filled-in parameter of the HTML form). While the response can be an actual response to the HTML form, an attacker may not have actually used the HTML form to respond, so the response is sometimes called an "apparent response" herein. Such an apparent response can comprise apparent parameter content of the HTML form. As described herein, such content can comprise parameter values of parameters of the HTML form, some of which may violate the derived rules.

At 260, it is determined whether the apparent parameter content of the HTML form of the apparent response violates the one or more derived rules. For example, a parameter value or condition of the content may violate a restriction, limit, or the like.

In practice, if no violation is detected, the response is passed on to the backend application. In such a case, the interposed HTML forms analyzer can serve as a proxy.

At 270, responsive to determining that the apparent parameter content of the HTML form of the apparent response violates the one or more derived rules, the apparent parameter content of the HTML form is blocked from the backend application. In practice, the HTML form response is blocked, which results in blocking the apparent parameter content of the HTML form. In some cases, additional processing can be performed. For example, because such a violation is virtually guaranteed to originate from a malicious actor, the connection can be continued and deceptive information can be provided in response, such as a honey-token (e.g., to surveil the attacker).

Determination of whether the apparent content violates a rule can comprise comparing a parameter value to a parameter value restriction. Other types of rules can be supported as described herein.

As described herein, the apparent response can be received by a proxy that selectively forwards the apparent response to the backend application.

As described herein, the apparent response can be received from an attacking software (e.g., a false browser) that generates values for the HTML form that violate client-side rules present in the code of the HTML form.

In practice, the deriving can comprise extracting client-side rules present in the HTML form. As described herein, further rules can be extracted. For example, deriving can comprise generating a parameter content restriction based on restrictions present in the code of the HTML form (e.g., value restrictions, length restrictions, formatting restrictions, or the like). Parameter content restrictions can be extracted from the source. Rules can be derived from such restrictions, and it is subsequently determined whether a provided value violates such a restriction.

A wide variety of rules can be supported, some of which are not client-side rules. For example, if a parameter of type hidden is detected, a must-be-present rule can be derived for the parameter. If a parameter of type disabled is detected, a must-not-be-present rule can be derived for the parameter. Other examples are described herein.

To cover further scenarios, a headless browser can process the HTML source, and as part of the processing also process the source code of the HTML form. As described herein, such a headless browser can mirror a Document Object Model (DOM) tree that would be presented at a client. Rules can be derived from the HTML drawn from the DOM tree.

In practice, a variety of scenarios can be supported. For example, determining whether the apparent parameter content of the HTML form of the apparent response violates the one or more derived rules can comprise determining whether the apparent parameter content of the HTML form contains parameter content that could not have been generated via the HTML form as presented at a client browser. Such a situation can arise when a value is outside of client-side restrictions, when a hidden parameter changes as described herein, or the like.

Similarly, the determining can comprise determining whether the apparent parameter content of the HTML form contains a value for a parameter that violates a parameter condition specified in the HTML form for the parameter. For example, it can be determined whether a value for a parameter violates a parameter formatting condition specified in the HTML form for the parameter. For example, a derived rule can be derived that enforces a format in HTML source. Rules can be derived from other parameter conditions (e.g., size, length, value, type, or the like) as described herein. Violation of the rules results in blocking the apparent parameter content.

Another example is when the code of the HTML form comprises an indication of a disabled parameter. In such a case, the determining can comprise determining whether the apparent parameter content of the HTML form contains a value for the disabled parameter. For example, a derived rules can be derived that determines whether the variable is present. If so, the apparent parameter content is blocked.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

Similarly, the method can be implemented in a computing system comprising at least one hardware processor, at least one memory coupled to the at least one hardware processor, and one or more non-transitory computer-readable media having stored therein computer-executable instructions that, when executed by the computing system, cause the computing system to perform the method.

The illustrated actions can be described from alternative perspectives while still implementing the technologies. For example, receiving a response can be described as receiving a response depending on perspective.

Example 4—Example HTML Source Code

In any of the examples herein, an HTML form can take the form of HTML source code, which is sometimes called "source," "code," or "HTML source." A HTML "FORM" tag typically introduces such code.

In ordinary practice, the HTML form is rendered on a client browser and includes fields or other user interface elements that allow entry or modification or parameters (e.g., name, address, quantity, amount, password, product name, or the like). A wide variety of input types are typically supported. A user computer can then enter values into form boxes or manipulate user interface elements to "fill in" the form. Typically, an OK or Submit box is provided by which the user computer can send a response to the form, which is embodied as an HTTP request that includes parameter content such as the values input to the form.

In practice, additional features such as disabled (read-only) values, hidden (not displayed) values, and the like can be used. As a result, forms are sometimes used as a way to persist variables, and such techniques can result in avenues for attack as an attacker can change such values and generate an apparent request to the form that could not have been generated by the form. Similarly, client-side restrictions on parameter values can be ignored by an attacker. Various other avenues of attack are possible.

HTML forms typically support either a GET or POST paradigm, and the technologies described herein can support either paradigm.

Example 5—Example HTML Form Response

As described, an HTML form response is typically embodied as an HTTP request that comprises apparent parameter content of the HTML form. As described herein, such parameter content can include a rule violation of one or more rules derived from the HTML form as described herein.

Both GET and POST paradigms can be supported. In the case where the response is provided as part of the URL, the parameter content of the URL can be analyzed to determine whether a derived rule violation is present.

Example 6—Example HTML Form Parameters

In any of the examples herein, an HTML form can comprise one or more parameters, which is sometimes called "parameter content" herein. Such parameters typically comprise a parameter name and a parameter value. Parameters are sometimes called "fields," which typically have a field name and a field value.

In some cases, a parameter may not yet have a value (e.g., it has a NULL value) or the value is removed. Such parameter content can be provided as part of an HTML form response as described herein.

In practice, HTML form parameters are specified using the "INPUT" tag which supports various attributes, such as a type, name, and restrictions as described herein. Supported restrictions include allowed values, allowed lengths, allowed formats, and the like. Various other parameter attributes can be useful for determining whether an HTML forms attack is taking place. For example, the "HIDDEN" attribute indicates that the parameter is not shown on the user computer. So, a rule can be derived that the value of a hidden parameter should not change (e.g., the condition of the rule is that the parameter should be the same in the response as it was in the original HTML source code sent).

As described herein, various other restrictions and conditions can be derived from the HTML source code.

Example 7—Example Apparent Browser

In any of the examples herein, the HTML form may be retrieved and filled out by an apparent browser, which could be a legitimate browser. Attacks are possible with a legitimate browser. For example, URL modification can be used to add or modify parameters, parameter values, or both.

In some cases, however, an attacker can use a false browser that is apparently a browser but does not actually present the HTML form for a user to read and fill out, or the false browser does not enforce the client-side rules. For example, a headless browser can simply read parameter values and submit a response that is not actually a response to a presented form. Of course, the values could be displayed to give the attacker ideas on what values to change. Indeed, hidden parameters could be shown for consideration by the attacker.

As described herein, the technologies described herein can detect when content was not possibly generated by a legitimate, properly functioning browser. Thus, another advantage of the technologies is that they can detect malicious attacks as being malicious and not merely a mistake.

Example 8—Example Derivation of Rule

In any of the examples involving rule derivation herein, at least two main types of rule derivation are possible. First, a client-side restriction (e.g., length, value, format, or the like) can be translated into a derived rule that is enforced on the server side (e.g., amount>=0). Second, a condition within the source code of the HTML form (e.g., parameter type hidden) can be mapped to server-side condition incorporated into a derived rule (e.g., the parameter must have same value as was originally sent to the client—not be modified). Other examples of rule derivation are possible.

Figure 3:
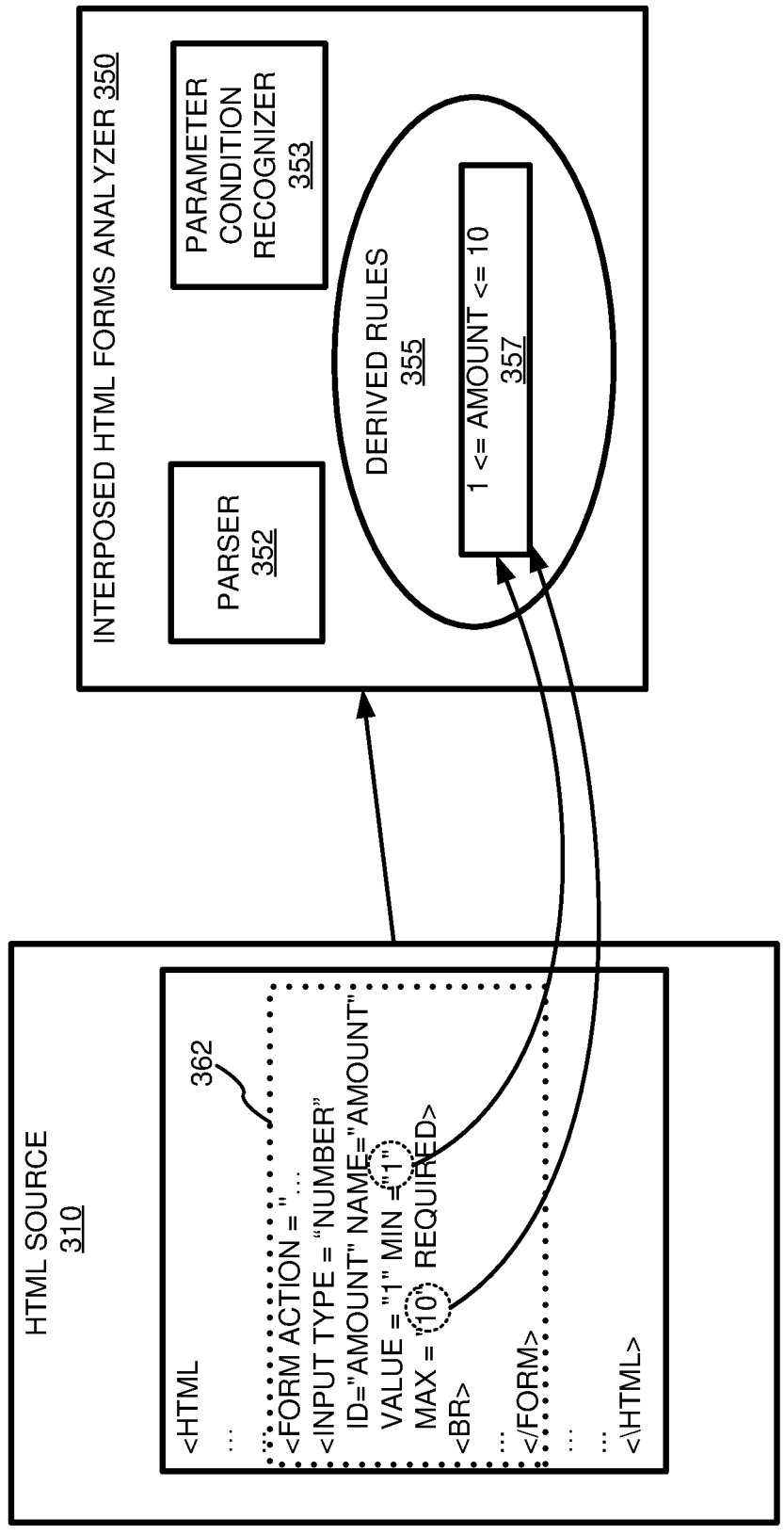
FIG. 3 is a block diagram of an example system deriving a rule from an HTML form.

FIG. 3 is a block diagram of an example system 300 deriving a rule from an HTML form. In the example, a rule 357 is derived from the source code 362 of the HTML form of the HTML source 310.

Rule derivation can be achieved by an interposed HTML forms analyzer 350 as described herein. For example, a parser 352 can parse the HTML form source 362 to extract those portions relating to parameters and extract parameter conditions from the form (e.g., parameter value restrictions, parameter type, or the like). The parameter condition recognizer 353 can map restrictions or attributes in the extracted portions to derived rules 355.

The parser 352 can scan the HTML source 310 to including the HTML form 362 (e.g., via the "FORM" tag), and then parse the HTML form elements, including any "INPUT" elements. A specialized parser can focus on the HTML elements of interest (e.g., FORM, INPUT, or the like) to reduce the parsing burden. In the example, the parser can extract a portion of the source 362 relating to the amount parameter, and parse the type number, minimum value 1 and maximum value 10. Thus, for the amount parameter, the conditions (e.g., in this case, client-side rules) include the type and a minimum and maximum value.

The parameter condition recognizer 353 can process the parsed HTML, recognizing any input elements containing attributes that are of interest for constructing rules (e.g., parameter names and conditions associated with them) and map them to rules 355. Each input element (e.g., parameter) can be considered in turn, some of which may have conditions that generate rules and others that do not. A number of rules can be derived by the parameter condition recognizer 353, which can map HTML attributes to derived rules, such as in the example, where it is indicated that amount must be greater than or equal to 1 and amount must be less than or equal to 10. Other rules, such as that amount must be a number (e.g., cannot contain non-numerical characters) can also be derived (e.g., "type(amount)=number" or the like). Thus, more than one rule can be derived for a single parameter.

Similarly, more than one rule can come out of a condition. For example, a parameter of type hidden must both be present and have the same value as was in the original source code for the form.

As described herein, deriving a rule can comprise extracting a value restriction on a parameter of the HTML form from the code of the HTML form.

A rule can be internally represented as a tree, string, table, or other structure that can store an indication of the rule (e.g., a name, code, condition, or the like), and one or more rule operands (e.g., the parameter name and optional parameter values).

Subsequently, when an apparent response is received, parameter content can be validated against the rules as described herein.

Example 9—Example Method of Deriving a Rule from an HTML form

Figure 4:
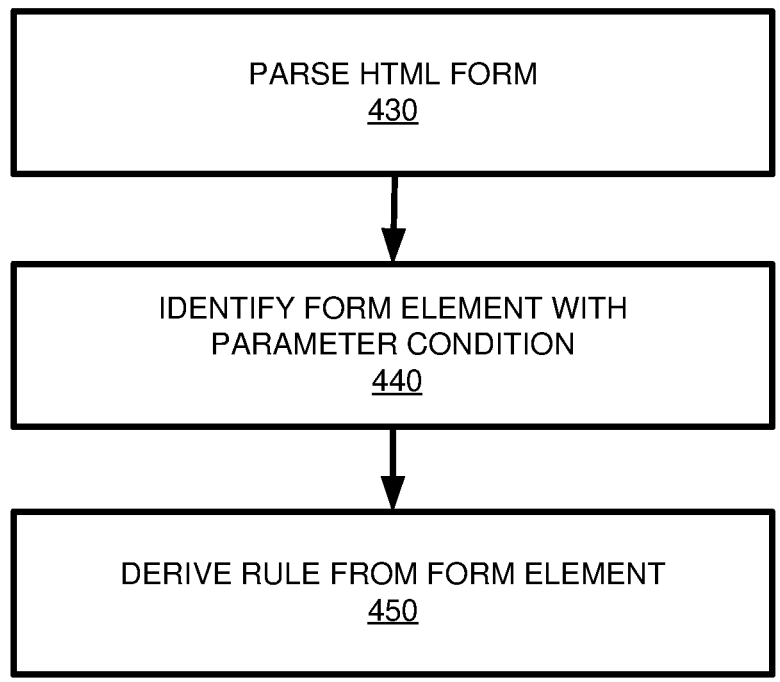
FIG. 4 is a flowchart of an example method of deriving a rule from an HTML form.

FIG. 4 is a flowchart of an example method 400 of deriving a rule from an HTML form and can be implemented in any of the examples herein (e.g., the systems shown in FIG. 1 or 3 or the method of FIG. 2).

At 430, the source code of the HTML form is parsed. Various arrangements are possible, such as constructing a tree, constructing a table, or the like. Parsing can be at a level that identifies parameters and associated keywords, values, operands, and the like in an HTML form.

At 440, an HTML form element with a parameter condition is identified in the parsed HTML form. For example, an "INPUT" element can include various attributes that can be identified as parameter conditions as described herein.

At 450, a rule is derived from the HTML form element based on the parsing results. For example, if an input element shows that a parameter has value restrictions, such parameter restrictions can be used to derive a rule for the HTML form.

Example 10—Example Mapping of HTML Parameter Conditions to Derived Rules

FIG. 5 is a block diagram of an example mapping 500 of HTML parameter conditions 510 in HTML source to derived rules 550. As described herein, the derived rules are applied against the parameter content of the response to HTML form response (e.g., in the HTTP request from the client to the server).

For example, the attribute 515 disabled for a parameter is mapped to a rule 555 that the parameter must not be present.

The attribute 520 required for a parameter is mapped to a rule 560 that the parameter must be present.

The attribute 525 pattern for a parameter is mapped to a rule 565 that the parameter must comply with the pattern specified in the HTML source code.

The attribute 530 minlength or maxlength is mapped to a rule 570 that the parameter must comply with the specified length restriction. Value restrictions can be similar.

The attribute 535 hidden is mapped to rules 575 that the parameter must be present and must have the value specified in the HTML source code.

As described herein, additional or other mappings are possible.

Example 11—Example HTML Source and Derived Rules

FIG. 6 is a block diagram of an example system 600 comprising example HTML source 610 and derived rules 655. FIG. 7 is a block diagram of an example table 700 showing derived rule definitions for rules derived from the HTML source 610 of FIG. 6.

The verb and URL values can be retrieved while parsing <form action="action_page.php">. The verb is POST by default. The URL can be useful for differentiation because other pages may have similar names with different rules.

Key indicates the name of the parameter.

Value and AlertIfModified are set if the parameter is of type hidden in the HTML source code.

AlertIfPresent is set if the parameter is of type disabled.

AlertIfAbsent is set if the parameter is of type required.

LengthMin, LengthMax, Min, Max, and Regex are retrieved from the corresponding attribute (keyword) from the HTML source code.

If a min or max are set, then the variable is considered a numeric value and result in a derived rule that the parameters cannot contain non-numeric content (e.g., letters). Such a rule can be explicit or implied as accompanying any rule for max or min.

Example 12—Example Further Details

In some cases, two requests to the same server could generate different responses that would lead to different rules to observe. For example, if each response comes with a unique identifier set as a hidden form field. Two approaches for handling such a situation can be implemented.

First, any of the generated values can be accepted on subsequent requests. Such an approach can still detect most violations. Second, session tokens (e.g., cookies) can be used to keep track of user sessions, which can then be used to link an HTTP request to the related previous HTTP response.

Example 13—Example with Dynamically-Modified HTML

In some situations, HTML can contain scripting (e.g., JavaScript) that dynamically modifies the HTML form (e.g., the DOM tree of the form) apparently rendered on the client's browser.

To address such a situation, a renderer can be added to the interposed HTML forms analyzer. For example, a headless browser can be used as a renderer. As a pre-processing step, the renderer can attempt to mirror the HTML (e.g., or equivalent DOM tree) at the client by executing the JavaScript. In practice, such JavaScript may dynamically modify the representation of the HTML at the client. For example, such JavaScript can include modifications to the DOM tree that stores the HTML for rendering, which then is reflected in the user interface. A renderer can execute such JavaScript (e.g., with a JavaScript execution engine) and make modifications to a local DOM tree on the server side, creating a local mirror of the DOM tree that is ostensibly present at the apparent browser. The resulting HTML code (e.g., or the equivalent DOM tree) can then be processed and parsed in place of the initial HTML code to derive rules therefrom. For purposes of discussion, the resulting HTML code can be treated as the "original" HTML code that is sent to the client.

Thus, in an implementation including such a renderer, the system can include a headless browser. The headless browser can be configured to mirror a DOM tree presented at a client browser (e.g., even if such a client browser is not actually used). The apparent content of the HTML form can be drawn from the mirrored DOM tree. Traversal of the DOM tree can locate the HTML form and process the form elements for rule derivation. In such a case, parsing may already have been partially performed because the DOM tree already stores the HTML in tree form.

Example 14—Example JavaScript Incorporating Client-side Rules

Besides HTML 5 standard tags such as pattern or required, client-side JavaScript is sometimes used to manipulate elements, such as modifying values of variables upon dynamic criteria or performing extra client-side validation.

The interposed HTML forms analyzer can be extended to parse JavaScript code to extract parameter conditions. For example, a regular expression involved via an onfocus event can be extracted. For elements that are beyond the processing capability (e.g., complex logic modifying the value of a hidden element upon submission), an active toggle can be added to each parameter. Such an approach enables deactivation of rules that would otherwise trigger a false positive.

For example, JavaScript code that checks whether a field has been filled out or not (e.g., equivalent to "required" keyword) may be present in a page. An example of such code is as follows:

TABLE

Code Checking Whether Field has been Filled Out

```
<script>
function validateForm( ) {
  let x = document. forms["myForm"]["fname"].value;
  if (x == "") {
    alert("Name must be filled out");
    return false;
  }
}
</script>
<form name="myForm" action="/action_page.php"
onsubmit="return
validateForm( )" method="post">
  Name: <input type="text" name="fname">
  <input type="submit" value="Submit">
</form>
```

A headless browser can receive the code as part of its rendered page. However, some analysis can further be done to determine that the code is equivalent to a required keyword. An example method of recognition is to check whether there is an onsubmit keyword specified in the <form> tag. If so, the corresponding JavaScript method can be found (e.g., function validateform( ) in the example). Then, an identification of what can return a failure (negative number or false) can be evaluated; failure indicates that a client-side rule was violated. Responsive to determining that it is a check to see if the field is blank (e.g., x=" ", where x is frame)), a rule can be added (e.g., frame is required).

Static code analysis can be used to bind resources to outcomes (e.g., using tainting). The analysis can follow what happens to user inputs. In the above example, it is determined whether a value is checked to be non-null. If so, a rule that the value must be present is created. Similarly, patterns can be extracted. For example, consider the following validation of an email address:

TABLE

Code Validating Email Address

```
<script>
function validateForm( ) {
  let x = document.forms["myForm"]["femail"].value;
  if (! x.match(/^[a-zA-Z0-9]+(?:\.[a-zA-Z0-9]+)*
  @[a-zA-Z0-9]+(?:\.[a-zA-Z0-9]+)*$/))
  {
    alert("Wrong email format");
    return false;
  }
}
</script>
<form name="myForm" action="/action_page.php" onsubmit="return
validateForm( )" method="post">
  Email: <input type="text" name="femail">
  <input type="submit" value="Submit">
</form>
```

In the example, a pattern (e.g., regular expression) can be extracted from the code and added as a rule.

Another example is that the input must be in uppercase as shown below.

TABLE

Code Validating Email Address and Uppercasing Input

```
<script>
function validateForm( ) {
  let x = document.forms["myForm"]["femail"].value;
  if (! x.match(/^[a-zA-Z0-9]+(?:\.[a-zA-Z0-9]+)*
  @[a-zA-Z0-9]+(?:\.[a-zA-Z0-9]+)*$/))
  {
    alert("Wrong email format");
    return false;
  }
}
function validateForm( ) {
  let x = document. forms["myForm"]["femail"].value;
  document.forms["myForm"]["femail"].value=x.toUpperCase( )
}
</script>
<form name="myForm" action="/action_page.php"
onsubmit="return
validateForm( )" method="post"
  Email: <input type="text" name="femail">
  <input type="submit" value="Submit" onclick="uppercase( )">
</form>
```

In the example, the JavaScript bound to the onclick event on the submit button can be evaluated to determine that uppercase has been applied. Therefore, a rule can be created that the parameter value must be uppercase (e.g., any lowercase causes the rule to fail). Tainting can be used to determine the parameter name.

Other events besides onsubmit and onclick/onfocus on the submit button can be considered as well, as long as they impact the content eventually submitted.

Thus, in any of the examples herein (e.g., the method of FIG. 4 or the like), analysis of the JavaScript of HTML source code of the page containing the HTML form can proceed to identify events (e.g., onsubmit, onclick, onfocus, or the like) that are associated with triggering activation of programmatic client-side rules. Methods (e.g., functions) executed upon such events can be analyzed and identified as imposing a programmatic client-side rule. Such a programmatic client-side rule can then be added to the one or more derived rules (e.g., a rule equivalent to the client-side rule is added). Thus a rule is added responsive to identifying a JavaScript method as imposing a programmatic client-side rule.

Example 15—Example Learning Scenario

In any of the examples herein, the technologies can support arbitrary HTML modification scenarios. For example, HTML code or the equivalent DOM tree can be modified in unanticipated ways. In such a case, a monitor can observe legitimate permitted values over time and then derive rules from such permitted values (e.g., determining ranges, presence of parameters, or the like). Such rules are essentially observed invariants. Subsequently, the system can switch over to an enforcement phase where such derived rules are enforced.

In practice, parameter content of a plurality of legitimate responses to the HTML form can be monitored. A parameter invariant can be determined across the legitimate permitted values for a parameter. For example, a value restriction, length restriction, required presence, or the like can be determined by finding an invariant across the permitted values (e.g., for all observed responses, the value of parameter X is between min and max). A derived rule can be derived from the invariant, and the rule can be added to the one or more derived rules.

For example, from the following two HTTP requests sent by users:
username=john&password=S3kr3t&SYSTEM=PROD
username=alice&password=13tmein&SYSTEM=PROD
one can infer that the parameter SYSTEM must be present and must have the value PROD.

A manual implementation can employ a visualization tool that shows the received requests. An administrative user can use the visualization to manually identify rules and create them.

An automated tool can set a threshold number of requests (e.g., 100), and then categorize a parameter as mandatory if always present, set a must-not-be-modified if always has the same value, and set as numeric if always consists of number values, and the like. A web application firewall can cooperate with such an approach, and machine learning models can be applied.

Example 16—Example Architecture

Figure 8:
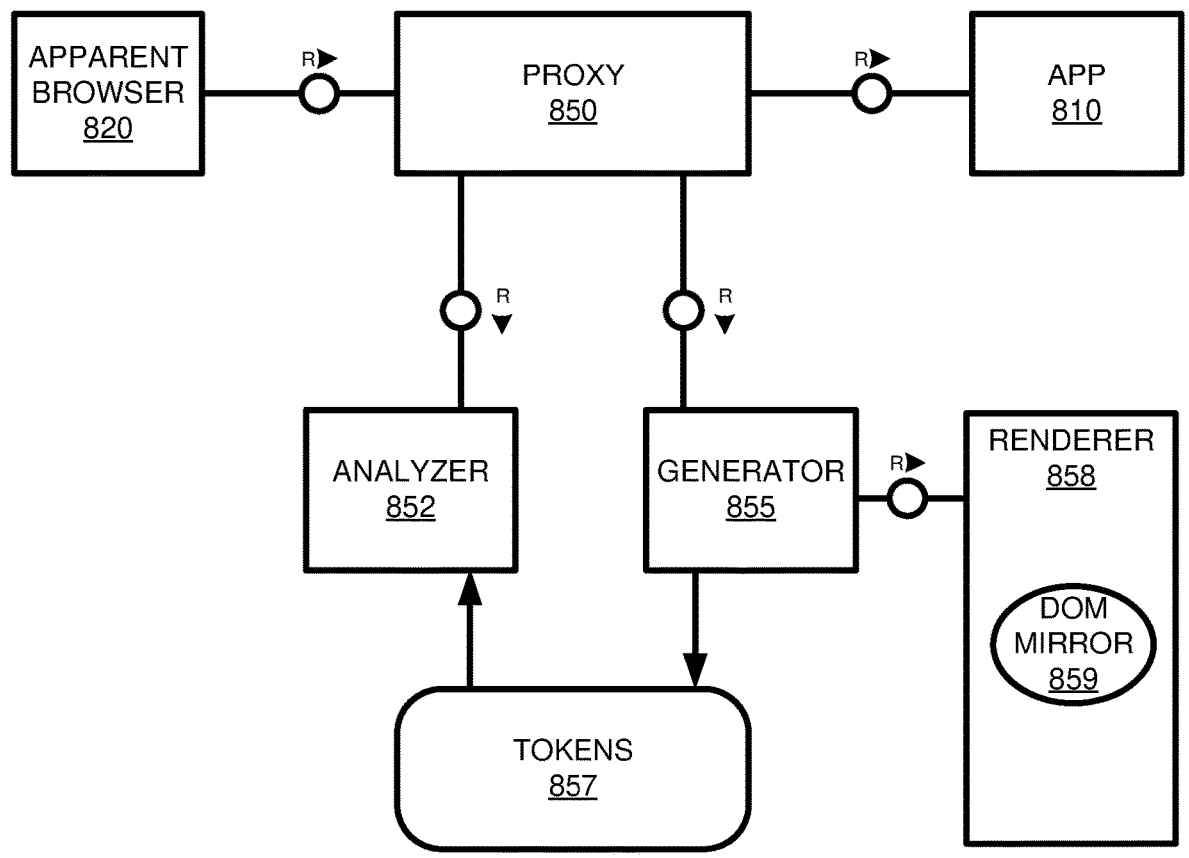
FIG. 8 is a block diagram of an example architecture of an implementation of protection of web forms.

FIG. 8 is a block diagram of an architecture 800 of an implementation of protection of web forms that can be used in any of the examples herein. The example shows an embodiment implemented as a more detailed version of FIG. 1. In the example, there is a backend application 810 as described herein. An apparent browser 820 as described herein is accessing functionality of the application 810, which provides HTML source that includes an HTML form. The proxy 850 can serve as the interposed HTML forms analyzer.

When a user makes a request, the Application 810 sends an HTTP response with a form such as the examples shown herein. The HTTP response is processed by the generator 855, which can create and store tokens 857 derived from the conditions in the HTML source of the HTML form (e.g., client-side validation rules and the like). In the example, the tokens 857 represent the derived rules.

When the form is apparently submitted in a subsequent request, the resulting HTTP request is received by the proxy 850 and is processed by the analyzer 852, which compares the parameters retrieved from the request against the tokens (derived rules) 857 created by the generator 855. If a violation is detected, then the request is blocked by the proxy 850 (e.g., it is not forwarded to the application 810) and an alert can be raised.

If desired, a renderer 858 can be implemented to handle scenarios where the HTML form is modified dynamically. As shown, the renderer 858 can include a local mirror 859 of the DOM tree that attempts to mimic the DOM tree at the apparent browser 820.

An automatic response can be implemented. For example, the user's account can be locked, the user's session can be re-routed to a honeypot, and the like.

Example 17—Example Intentionality

The techniques described herein can be particularly useful because they indicate intentionality of an attack. Violations of rules can be detected dynamically (e.g., based on whatever HTML form is involved) upon reception of an incoming request with HTML form parameter content. If a violation is detected, it is virtually guaranteed to be malicious and not due to a mistake or typographical error. For example, following the example HTML of 610, if the server receives an HTTP request where amount is a null or a negative value, it means that the client-side validation was bypassed and thus that the forbidden value was set on purpose (e.g., with an intention to violate the client-side restriction). An attack is therefore in progress.

Accordingly, further steps to surveil the attacker can be taken. For example, a custom response to the request can include a honeytoken or other deceptive content meant to lead the attacker on so that further information can be collected about the attack. In this way, the attacker can be revealed, the attack technique can be monitored, or the like.

In an initial request (e.g., before the HTML form is presented), the analyzer 852 finds no tokens 857, so it can forward the request (e.g., "GET I") to the application.

Example 18—Example Traps

Given that the technologies can detect malicious behavior, opportunities for being malicious can be included. For example, a hidden field can be added to a form as a trap, even if the hidden field is not ever actually used by the application. Modification of the hidden field is detected, thus identifying an attack.

Example 19—Example Implementations

Any of the following can be implemented.
Clause 1. A computer-implemented method comprising:
receiving source code of an HTML form from a backend application;
deriving one or more derived rules from the source code of the HTML form;
receiving an apparent response to the HTML form, wherein the apparent response comprises apparent parameter content of the HTML form;
determining whether the apparent parameter content of the HTML form of the apparent response violates the one or more derived rules;
responsive to determining that the apparent parameter content of the HTML form of the apparent response violates the one or more derived rules, blocking the apparent parameter content of the HTML form from the backend application.
Clause 2. The method of Clause 1, wherein:
the determining comprises determining whether the apparent parameter content of the HTML form contains parameter content that could not have been generated via the HTML form as presented at a client browser.

Clause 3. The method of any one of Clauses 1-2, wherein:
the determining comprises determining whether the apparent parameter content of the HTML form contains a value for a parameter that violates a parameter condition specified in the HTML form for the parameter.

Clause 4. The method of any one of Clauses 1-3, wherein:
the determining determines whether the apparent parameter content of the HTML form contains a value for a parameter that violates a parameter formatting condition specified in the HTML form for the parameter.

Clause 5. The method of any one of Clauses 1-4, wherein:
the code of the HTML form comprises an indication of a disabled parameter; and
the determining comprises determining whether the apparent parameter content of the HTML form contains a value for the disabled parameter.

Clause 6. The method of any one of Clauses 1-5, wherein:
the deriving comprises extracting client-side rules present in the HTML form.

Clause 7. The method of any one of Clauses 1-6, wherein:
the deriving comprises generating a parameter content restriction based on restrictions present in the source code of the HTML form.

Clause 8. The method of any one of Clauses 1-7, wherein:
the deriving comprises extracting a parameter content restriction of a parameter from the source code of the HTML form; and
the determining comprises determining whether a value provided for the parameter violates the parameter content restriction.

Clause 9. The method of any one of Clauses 1-8, wherein:
the apparent response to the HTML form comprises an HTTP request comprising an HTML form response to the HTML form; and the HTTP request is directed to the backend application.

Clause 10. The method of any one of Clauses 1-9, wherein:
the apparent response is received from an attacking software that generates values for the HTML form that violate client-side rules present in the source code of the HTML form.

Clause 11. The method of any one of Clauses 1-10, wherein:
the apparent response is received from a false browser that generates values for the HTML form that violate client-side rules present in the source code of the HTML form.

Clause 12. The method of any one of Clauses 1-11, further comprising:
before deriving the derived rules, processing the source code of an HTML form with a headless browser, thereby mirroring a DOM tree that would be presented at a client.

Clause 13. The method of any one of Clauses 1-12, further comprising:
monitoring parameter content of a plurality of legitimate responses to the HTML form;
determining a parameter invariant across the legitimate permitted values for a parameter; and
deriving a derived invariant rule from the parameter invariant; and adding the derived invariant rule to the one or more derived rules.

Clause 14. The method of any one of Clauses 1-13, further comprising:
identifying a JavaScript function as imposing a programmatic client-side rule; and
adding the programmatic client-side rule to the one or more derived rules.

Clause 15. The method of any one of Clauses 1-14, wherein:
deriving the one or more derived rules from the source code of the HTML form comprises deriving a must-be-present rule responsive to detecting a parameter of type hidden in the source code of the HTML form.

Clause 16. The method of any one of Clauses 1-15, wherein the deriving comprises:
parsing the source code of the HTML form;
in the parsed source code, identifying an HTML element of the HTML form with a parameter condition; and
deriving at least one of the derived rules from the HTML form element.

Clause 17. A computing system comprising:
at least one hardware processor;
at least one memory coupled to the at least one hardware processor; and
one or more non-transitory computer-readable media having stored therein computer-executable instructions that, when executed by the computing system, cause the computing system to perform:
receiving code of an HTML form from a backend application;
deriving one or more derived rules from the code of the HTML form;
receiving an HTTP request with apparent content of the HTML form;
determining whether the apparent content of the HTML form of the HTTP request violates the one or more rules;
responsive to determining that apparent content of the HTML form violates the one or more rules, blocking the apparent content of the HTML form from the backend application.

Clause 18. The computing system of Clause 17 further comprising:
a proxy;
wherein the proxy is configured to receive the code of the HTML form from the backend application, derive the one or more rules from the code of the HTML form, receiving the HTTP request, determine whether the apparent content violates the one or more rules, and block the apparent content of the HTML form from the backend application responsive to determining that apparent content of the HTML form violates the one or more rules.

Clause 19. The computing system of any one of Clauses 117-18 further comprising:
a headless browser;
wherein:
the headless browser is configured to mirror a DOM tree presented at a client browser; and
the apparent content of the HTML form is drawn from the mirrored DOM tree.

Clause 20. One or more non-transitory computer-readable media comprising computer-executable instructions that, when executed by a computing system, cause the computing system to perform operations comprising:
receiving code of an HTML form from a backend application;
deriving one or more rules from the code of the HTML form, wherein the deriving comprises extracting a value restriction on a parameter of the HTML form from the code of the HTML form;

receiving an HTTP request with apparent content of the HTML form in response to the HTML form, wherein the apparent content comprises a value for an apparently filled-in parameter of the HTML form;

determining whether the apparent content of the HTML form of the HTTP request violates the one or more rules, wherein the determining comprises comparing the value to the value restriction;

responsive to determining that apparent content of the HTML form violates the one or more rules, blocking the apparent content of the HTML form from the backend application.

Clause 21. One or more non-transitory computer-readable media comprising computer-executable instructions that, when executed by a computing system, cause the computing system to perform the method of any one of Clauses 1-16.

Example 20—Example Advantages

A number of advantages can be achieved via the technologies described herein. For example, because rules can be generated in an automated fashion from HTML source, enforcement of client-side parameter rules (e.g., conditions as described herein) can be implemented without having to explicitly include logic in a backend application to check for such conditions. The advantage of not forcing developers to perform extra work and coding in their applications is clear.

Further rules relating to other conditions (e.g., hidden parameters, disabled parameters, etc.) can be derived as described herein.

As a result, detection of and blocking attacks can be more reliably implemented, resulting in overall better software security.

Notably, instances of a false browser (e.g., behavior that could not originate from a legitimate browser) can be detected. Because such behavior could not originate from a legitimate browser (e.g., it is not a typo), the techniques can provide a reliable way of detecting whether an attack is taking place. So, false positives are avoided.

Such technologies can generally improve software and network security, resulting in a more secure environment that avoids data loss, downtime, analysis, incident response, compliance efforts, and the like.

Finally, the reliable attack detection technologies described herein can actively identify and prevent future attacks, generally causing higher productivity due to avoiding down time, loss of resources, and the like.

Example 21—Example Computing Systems

Figure 9:
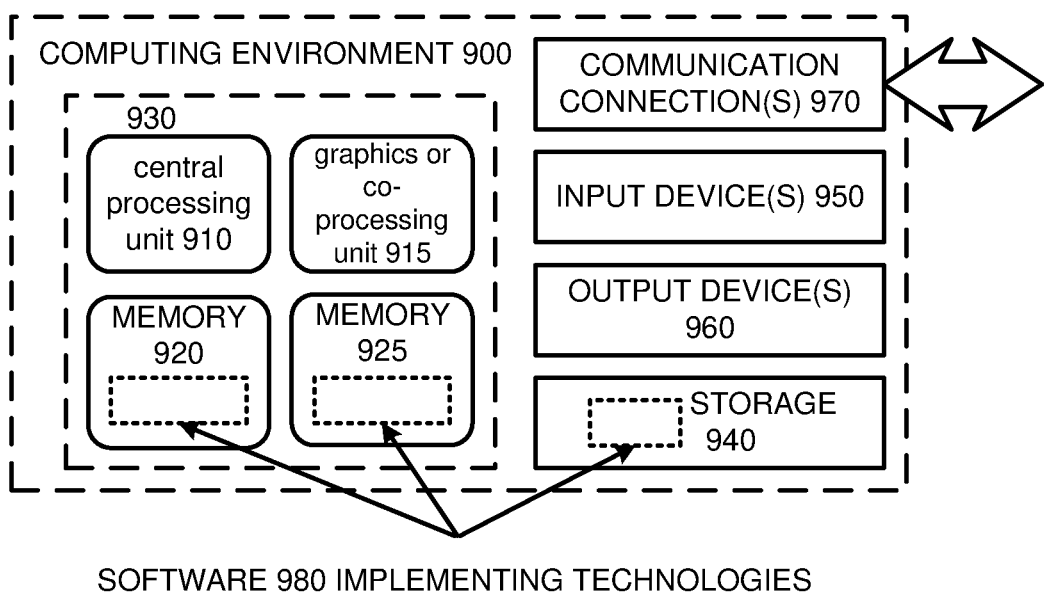
FIG. 9 is a block diagram of an example computing system in which described embodiments can be implemented.

FIG. 9 depicts an example of a suitable computing system 900 in which the described innovations can be implemented. The computing system 900 is not intended to suggest any limitation as to scope of use or functionality of the present disclosure, as the innovations can be implemented in diverse computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 can be volatile memory (e.g., registers, cache, RAM), non-volatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 can have additional features. For example, the computing system 900 includes storage 940, one or more input devices 950, one or more output devices 960, and one or more communication connections 970, including input devices, output devices, and communication connections for interacting with a user. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 can be removable or non-removable, and includes magnetic disks, magnetic tapes or cassettes, CD-ROMs, DVDs, or any other medium which can be used to store information in a non-transitory way and which can be accessed within the computing system 900. The storage 940 stores instructions for the software 980 implementing one or more innovations described herein.

The input device(s) 950 can be an input device such as a keyboard, mouse, pen, or trackball, a voice input device, a scanning device, touch device (e.g., touchpad, display, or the like) or another device that provides input to the computing system 900. The output device(s) 960 can be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 22—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 23—Example Cloud Computing Environment

Figure 10:
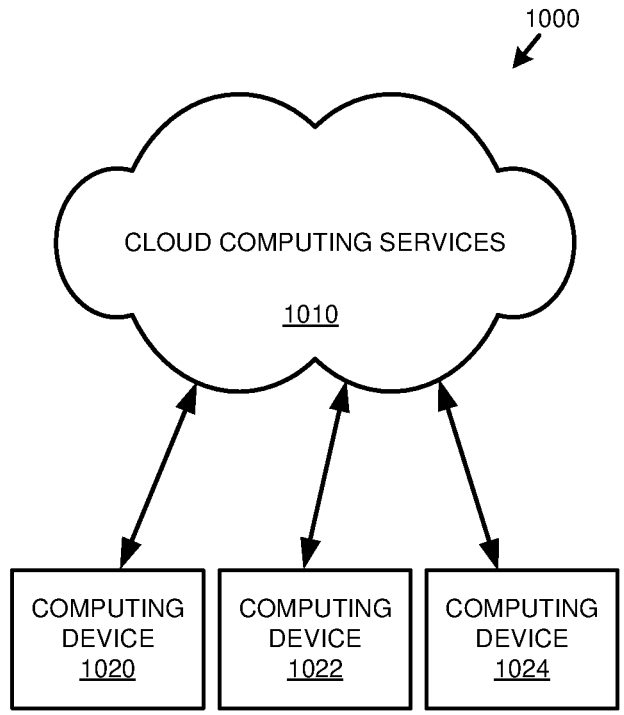
FIG. 10 is a block diagram of an example cloud computing environment that can be used in conjunction with the technologies described herein.

FIG. 10 depicts an example cloud computing environment 1000 in which the described technologies can be implemented, including, e.g., the system 100 of FIG. 1 and other systems herein. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operations (e.g., data processing, data storage, and the like).

In practice, cloud-based, on-premises-based, or hybrid scenarios can be supported.

Example 24—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 25—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
receiving source code of an HTML form from a backend application;
deriving one or more rules from the source code of the HTML form;
receiving a response to the HTML form, wherein the response comprises parameter content of the HTML form;
determining whether the parameter content of the HTML form of the response violates the one or more rules; and
responsive to determining that the parameter content of the HTML form of the response violates the one or more rules, blocking the parameter content of the HTML form from the backend application,
wherein the source code of the HTML form comprises an indication of a disabled parameter, and wherein the determining comprises determining whether the parameter content of the HTML form contains a value for the disabled parameter.

2. The method of claim 1, wherein:
the determining comprises determining whether the parameter content of the HTML form contains parameter content that could not have been generated via the HTML form as presented at a client browser.

3. The method of claim 1, wherein:
the determining comprises determining whether the parameter content of the HTML form contains a value for a parameter that violates a parameter condition specified in the HTML form for the parameter.

4. The method of claim 1, wherein:
the determining determines whether the parameter content of the HTML form contains a value for a parameter that violates a parameter formatting condition specified in the HTML form for the parameter.

5. The method of claim 1, wherein:
the deriving comprises extracting client-side rules present in the HTML form.

6. The method of claim 1, wherein:
the deriving comprises generating a parameter content restriction based on restrictions present in the source code of the HTML form.

7. The method of claim 1, wherein:
the deriving comprises extracting a parameter content restriction of a parameter from the source code of the HTML form; and
the determining comprises determining whether a value provided for the parameter violates the parameter content restriction.

8. The method of claim 1, wherein:
the response to the HTML form comprises an HTTP request comprising an HTML form response to the HTML form; and
the HTTP request is directed to the backend application.

9. The method of claim 1, wherein:
the response is received from an attacking software that generates values for the HTML form that violate client-side rules present in the source code of the HTML form.

10. The method of claim 1, wherein:
the response is received from a non-legitimate browser that generates values for the HTML form that violate client-side rules present in the source code of the HTML form.

11. The method of claim 1, further comprising:
before deriving the rules, processing the source code of an HTML form with a headless browser, thereby mirroring a DOM tree that would be presented at a client.

12. The method of claim 1, further comprising:
monitoring legitimate permitted values for a parameter contained in a plurality of legitimate responses to the HTML form;
determining a parameter invariant across the legitimate permitted values for the parameter; and
deriving an invariant rule from the parameter invariant; and
adding the invariant rule to the one or more rules.

13. The method of claim 1, further comprising:
identifying a JavaScript method in the source code of the HTML form;
extracting a client-side rule based on the JavaScript method; and
adding the client-side rule to the one or more rules.

14. The method of claim 1, wherein:
deriving the one or more rules from the source code of the HTML form comprises deriving a must-be-present rule responsive to detecting a parameter of type "hidden" in the source code of the HTML form, wherein the must-be-present rule specifies that a value for the parameter of type "hidden" cannot be modified.

15. The method of claim 1, wherein the deriving comprises:
parsing the source code of the HTML form;
in the parsed source code, identifying an HTML element of the HTML form with a parameter condition; and
deriving at least one of the rules from the HTML form element.

16. A computing system comprising:
at least one hardware processor;
at least one memory coupled to the at least one hardware processor; and
one or more non-transitory computer-readable media having stored therein computer-executable instructions that, when executed by the computing system, cause the computing system to perform:
receiving code of an HTML form from a backend application;
deriving one or more rules from the code of the HTML form;
receiving an HTTP request with parameter content of the HTML form;
determining whether the parameter content of the HTML form of the HTTP request violates the one or more rules; and
responsive to determining that parameter content of the HTML form violates the one or more rules, blocking the parameter content of the HTML form from the backend application,
wherein deriving the one or more rules from the code of the HTML form comprises deriving a must-be-present rule responsive to detecting a parameter of type "hidden" in the code of the HTML form, wherein the must-be-present rule specifies that a value for the parameter of type "hidden" cannot be modified.

17. The computing system of claim 16 further comprising:
a proxy;
wherein the proxy is configured to receive the code of the HTML form from the backend application, derive the one or more rules from the code of the HTML form, receiving the HTTP request, determine whether the parameter content violates the one or more rules, and block the parameter content of the HTML form from the backend application responsive to determining that parameter content of the HTML form violates the one or more rules.

18. The computing system of claim 16 further comprising:
a headless browser;
wherein:
the headless browser is configured to mirror a DOM tree presented at a client browser; and
the parameter content of the HTML form is drawn from the mirrored DOM tree.

19. One or more non-transitory computer-readable media comprising computer-executable instructions that, when executed by a computing system, cause the computing system to perform operations comprising:
receiving code of an HTML form from a backend application;
deriving one or more rules from the code of the HTML form, wherein the deriving comprises extracting a value restriction on a parameter of the HTML form from the code of the HTML form;
identifying a JavaScript method in the code of the HTML form;
extracting a client-side rule based on the JavaScript method:
adding the client-side rule to the one or more rules;
receiving an HTTP request with parameter content of the HTML form in response to the HTML form, wherein the parameter content comprises a value for an apparently filled-in parameter of the HTML form;
determining whether the parameter content of the HTML form of the HTTP request violates the one or more rules, wherein the determining comprises comparing the value to the value restriction; and
responsive to determining that parameter content of the HTML form violates the one or more rules, blocking the parameter content of the HTML form from the backend application.

* * * * *